United States Patent
Metcalf

(10) Patent No.: US 10,499,563 B1
(45) Date of Patent: Dec. 10, 2019

(54) JUMP PIT SAND LEVELING DEVICE

(71) Applicant: Doug Metcalf, Brookings, SD (US)

(72) Inventor: Doug Metcalf, Brookings, SD (US)

( * ) Notice: Subject to any disclaimer, the term of this patent is extended or adjusted under 35 U.S.C. 154(b) by 0 days.

(21) Appl. No.: 16/430,622

(22) Filed: Jun. 4, 2019

Related U.S. Application Data

(63) Continuation-in-part of application No. 16/058,650, filed on Aug. 8, 2018, now abandoned.

(51) Int. Cl.
| | |
|---|---|
| *A01D 7/10* | (2006.01) |
| *A01D 7/00* | (2006.01) |
| *A01B 31/00* | (2006.01) |
| *E01C 19/29* | (2006.01) |
| *A63C 19/02* | (2006.01) |
| *E01C 23/082* | (2006.01) |

(52) U.S. Cl.
CPC ............... *A01D 7/10* (2013.01); *A01B 31/00* (2013.01); *A01D 7/00* (2013.01); *A63C 19/02* (2013.01); *E01C 19/29* (2013.01); *E01C 23/082* (2013.01)

(58) Field of Classification Search
CPC ... A01D 7/00; A01D 7/02; A01D 7/06; A01D 7/10; A01B 31/00; E01C 19/12; E01C 19/15; E01C 19/29
See application file for complete search history.

(56) References Cited

U.S. PATENT DOCUMENTS

| | | | | |
|---|---|---|---|---|
| 1,768,080 | A | * | 6/1930 | Kurihara ............... A01D 76/006 56/249 |
| 2,510,188 | A | * | 6/1950 | Morrison ............... A01G 20/30 56/400.14 |
| 2,879,852 | A | | 3/1959 | Ellerman |
| 2,993,330 | A | * | 7/1961 | Brady ..................... A01D 7/10 56/400.09 |
| 4,284,273 | A | | 8/1981 | Gansewig |
| 4,821,500 | A | * | 4/1989 | MacIvergan ............. A01D 7/00 56/400.01 |
| 5,357,739 | A | | 10/1994 | Nuss |
| 5,957,215 | A | * | 9/1999 | Diehl ................... E01C 23/0825 172/26 |
| 6,350,083 | B1 | * | 2/2002 | Paladeni ................ E01C 19/29 404/101 |
| 2007/0267204 | A1 | | 11/2007 | Grosberg |

FOREIGN PATENT DOCUMENTS

| | | |
|---|---|---|
| CN | 203235226 | 10/2013 |
| CN | 204637526 | 9/2015 |
| CN | 20613185 | 4/2017 |
| DE | 102014008090 | 12/2015 |

\* cited by examiner

*Primary Examiner* — Alicia Torres

(57) ABSTRACT

A jumping pit raking assembly includes an elongated member having a first lateral edge, a second lateral edge, a front side, a rear side and a bottom edge. A sand engaging member is attached to the elongated member and extends downwardly from the bottom edge. The sand engaging member engages sand such that the sand is smoothed as the sand engaging member being moved across the sand. A pair of carriages is provided and each includes an end panel having an interior side and an exterior side positioned opposite of each other. A first wheel and a second wheel each is rotatably coupled to the end panel and extends downwardly therefrom. A handle coupled to the end panel.

16 Claims, 17 Drawing Sheets

JUMP PIT SAND LEVELING DEVICE

CROSS-REFERENCE TO RELATED APPLICATIONS

This application is a continuation in part of U.S. application Ser. No. 16/058,650, filed Aug. 8, 2018.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sand raking device and more particularly pertains to a new sand raking device for sand pits used for athletic competitions, such as long jumping. After a sand pit is landed in by an athlete it must be made completely smooth before the next jump to ensure an accurate measurement of jumping distance.

(2) Description of Related Art Including Information Disclosed Under 37 CFR 1.97 and 1.98

The disclosure and prior art relates to sand raking devices and more particularly pertains to a new sand raking device for raking sand found in a pit used for competitive long jumping contests to ensure that the sand is horizontally planar and smooth to ensure equality in landing conditions for all competitors.

BRIEF SUMMARY OF THE INVENTION

An embodiment of the disclosure meets the needs presented above by generally comprising a plate that has a top edge, a bottom edge, a first lateral edge, a second lateral edge a front side and a rear side. A plurality of tines is attached to and extends downwardly from the bottom edge. Each of the tines has an attached end attached to the plate and a bottom end distal to the attached ends. A pair of end panels is provided and each of the end first and second lateral edges has one of the end panels attached thereto. Each of the end panels has an interior side facing the plate and an exterior side positioned opposite of a corresponding one of the interior sides. A first pair of wheels is rotatably coupled to the exterior surface of one of the end panels and a second pair of wheels is rotatably coupled to the exterior surface of another one of the end panels. A first handle is pivotally coupled to one of the end panels and a second handle is pivotally coupled to another one of the end panels.

In another embodiment, an elongated member has a first lateral edge, a second lateral edge, a front side, a rear side and a bottom edge. A sand engaging member is attached to the elongated member and extends downwardly from the bottom edge. The sand engaging member engages sand such that the sand is smoothed as the sand engaging member being moved across the sand. A pair of carriages is provided and each includes an end panel having an interior side and an exterior side positioned opposite of each other. A first wheel and a second wheel each is rotatably coupled to the end panel and extends downwardly therefrom. A handle coupled to the end panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
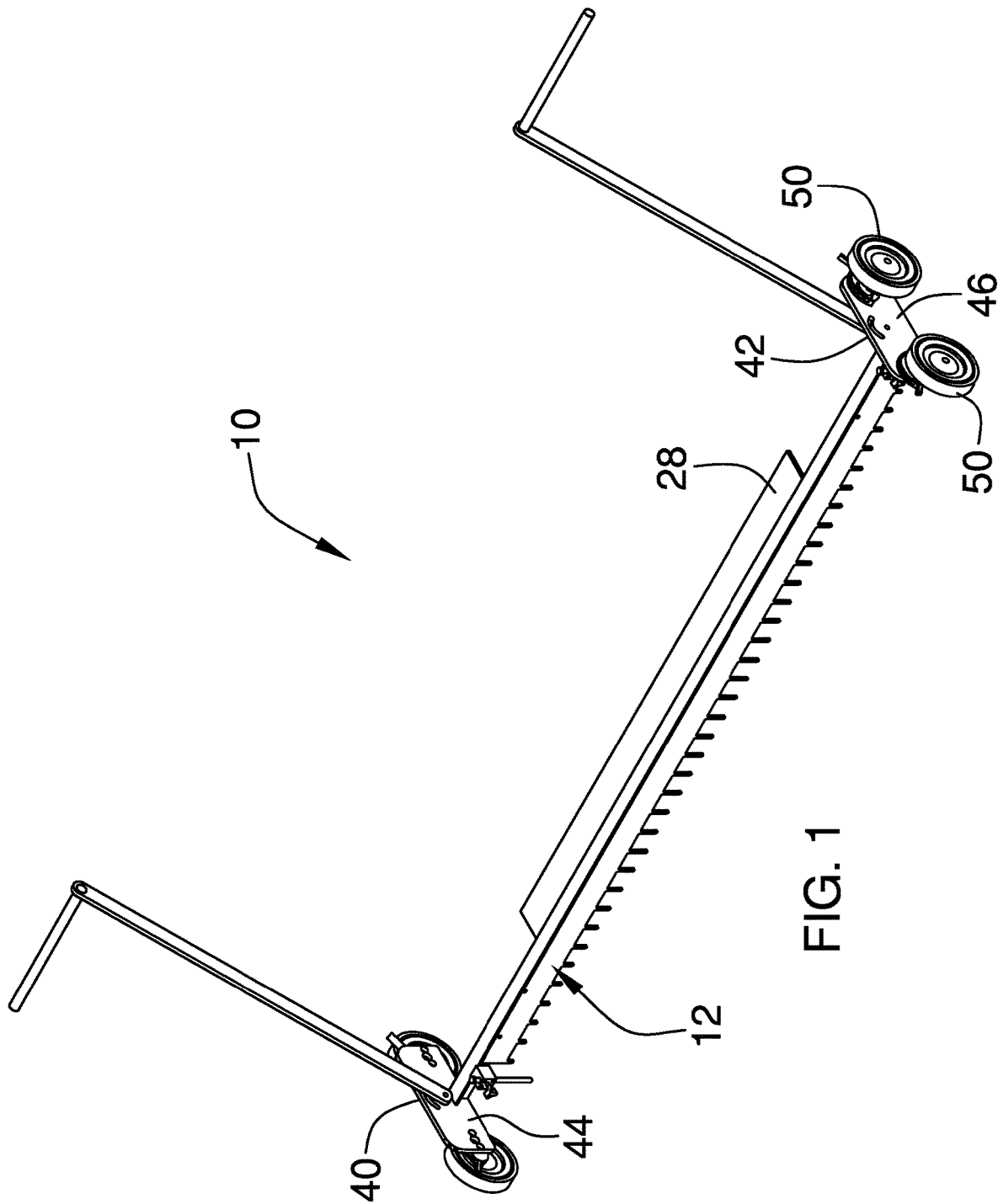
FIG. 1 is a front right isometric view of a jumping pit raking assembly according to an embodiment of the disclosure.

With reference now to the drawings, and in particular to FIGS. 1 through 17 thereof, a new sand raking device embodying the principles and concepts of an embodiment of the disclosure and generally designated by the reference numeral 10 will be described.

In a first embodiment, as best illustrated in FIGS. 1 through 9, the jumping pit raking assembly 10 generally comprises a plate 12 that has a top edge 14, a bottom edge 16, a first lateral edge 18, a second lateral edge 20, a front side 22 and a rear side 24. The plate 12 has a length from the first lateral edge 18 to the second lateral edge 20 that is between 8.5 feet and 9.5 feet. The plate 12 is comprised of a rigid material, such as steel, though plastics may also be utilized. The plate 12 may further include a T-brace 26 with an upper wall 28 that extends rearwardly of the rear side 24 to prevent bowing of the plate 12.

A plurality of tines 30 is attached to and extends downwardly from the bottom edge 14. Each of the tines 30 has an attached end 32 attached to the plate 12 and a bottom end 34 distal to the attached ends 32. Each of the bottom ends 34 is rounded. The tines 30 include central teeth 36 positioned on a central portion of the plate 12 and a plurality of outer teeth 38 positioned on outer portions of the plate 12 so that the central portion is positioned between the outer portions. The central portion has a length between 4.5 feet and 5.5 feet.

The central teeth 36 have a uniform shape and are spaced from each other between 2.5 and 3.5 inches and more particularly may be spaced 3.0 inches from each other. This distance between the central teeth 36 is measured from a center of one tine 30 to the center of the next adjacent tine 30. Each of the central teeth 36 has a height equal to between 1.75 inches and 2.25 inches and may specifically have a height of 2.0 inches. The central teeth 36 each have a width decreasing from the attached ends 32 to corresponding ones of the bottom ends 34. Wherein the attached ends 32 of the central teeth 36 have a width that may be equal to 0.625 inches and the bottom ends 34 of the central teeth 36 are formed on arc that may a diameter that may be equal to 0.25 inches. The outer teeth 38 decrease in height from the central portion to the first 18 and second 20 lateral edges such that the outer teeth 38 positioned adjacent to the first 18 and second 20 lateral edges have a height between 0.75 inches and 1.25 inches. The outer teeth 38 have a similar width to the central teeth 36 at their attached ends 32 and at their bottom ends 34 and also are spaced a same distance apart.

A pair of end panels 40, 42 is provided and each of the end first and second lateral edges has one of the end panels 40, 42 positioned attached thereto such that the panels 40,42 form end walls for the plate 12. As can be seen in the Figures, the plate 12 need not be attached directly to the end panels 40, 42 but may be attached to the T-brace 26 on which the plate 12 is mounted. Each of the end panels 40, 42 has an interior side 44 facing the plate 12 and an exterior side 46 positioned opposite of a corresponding one of the interior sides 44. The end panels 40, 42 each lie in planes orientated perpendicular to a longitudinal axis of the plate 12.

Figure 2:
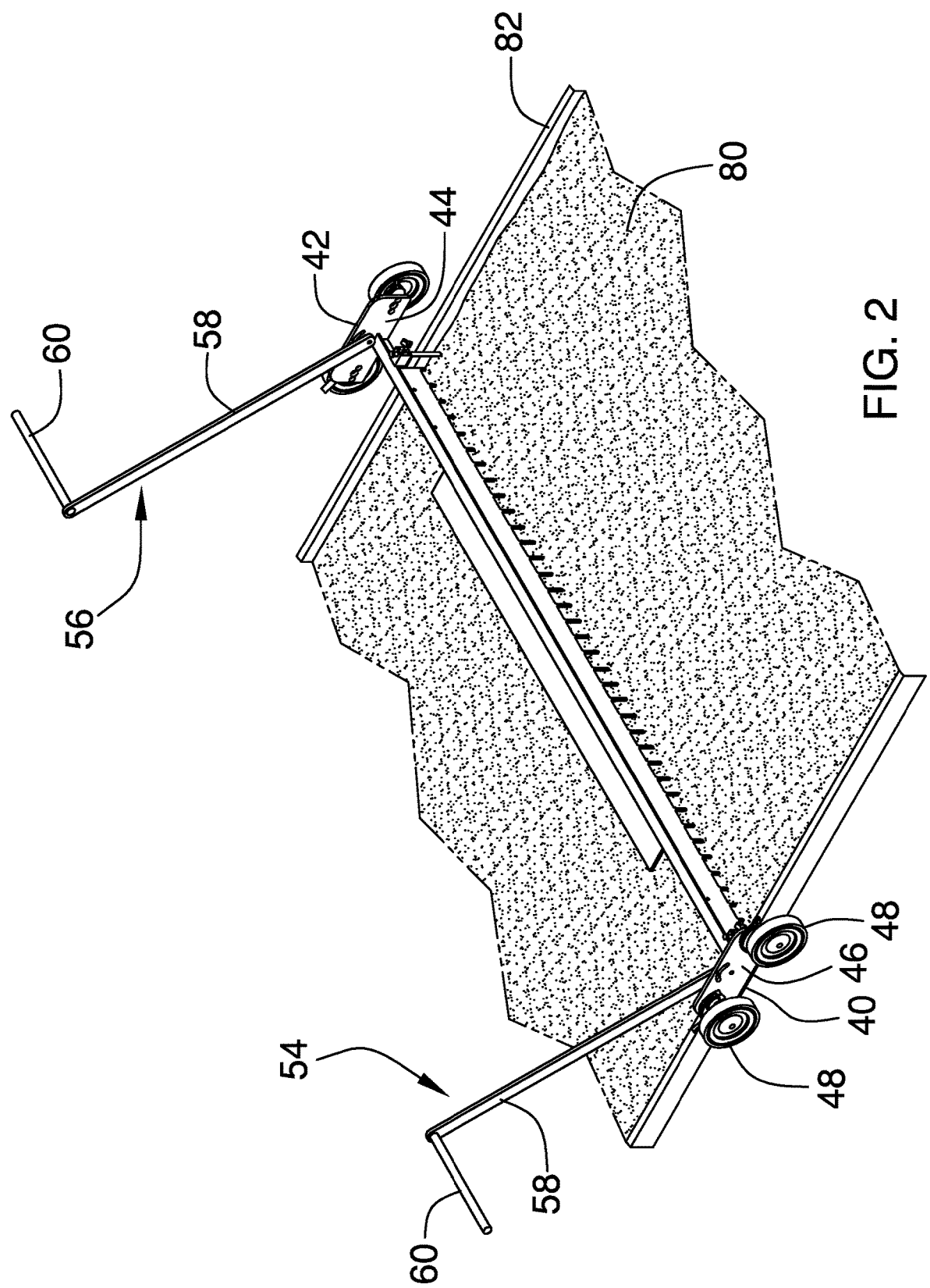
FIG. 2 is a front left isometric view of an embodiment of the disclosure.
Figure 3:
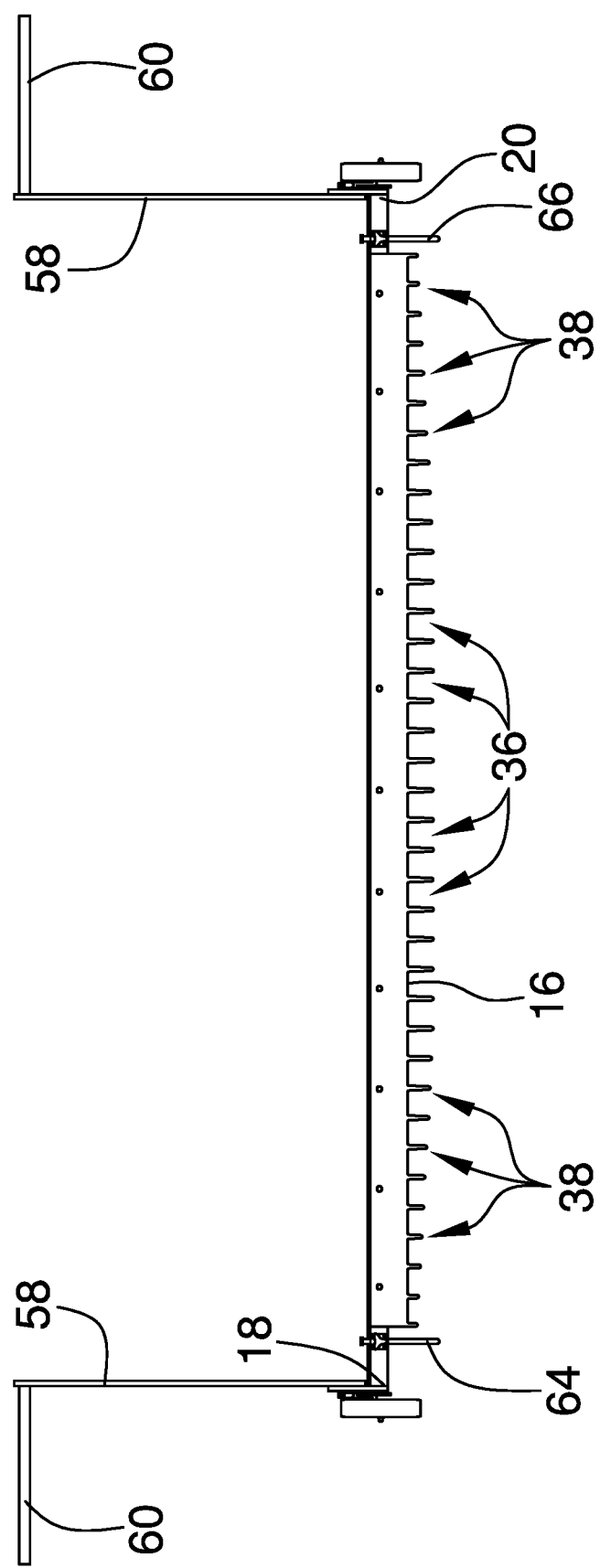
FIG. 3 is a front view of an embodiment of the disclosure.
Figure 4:
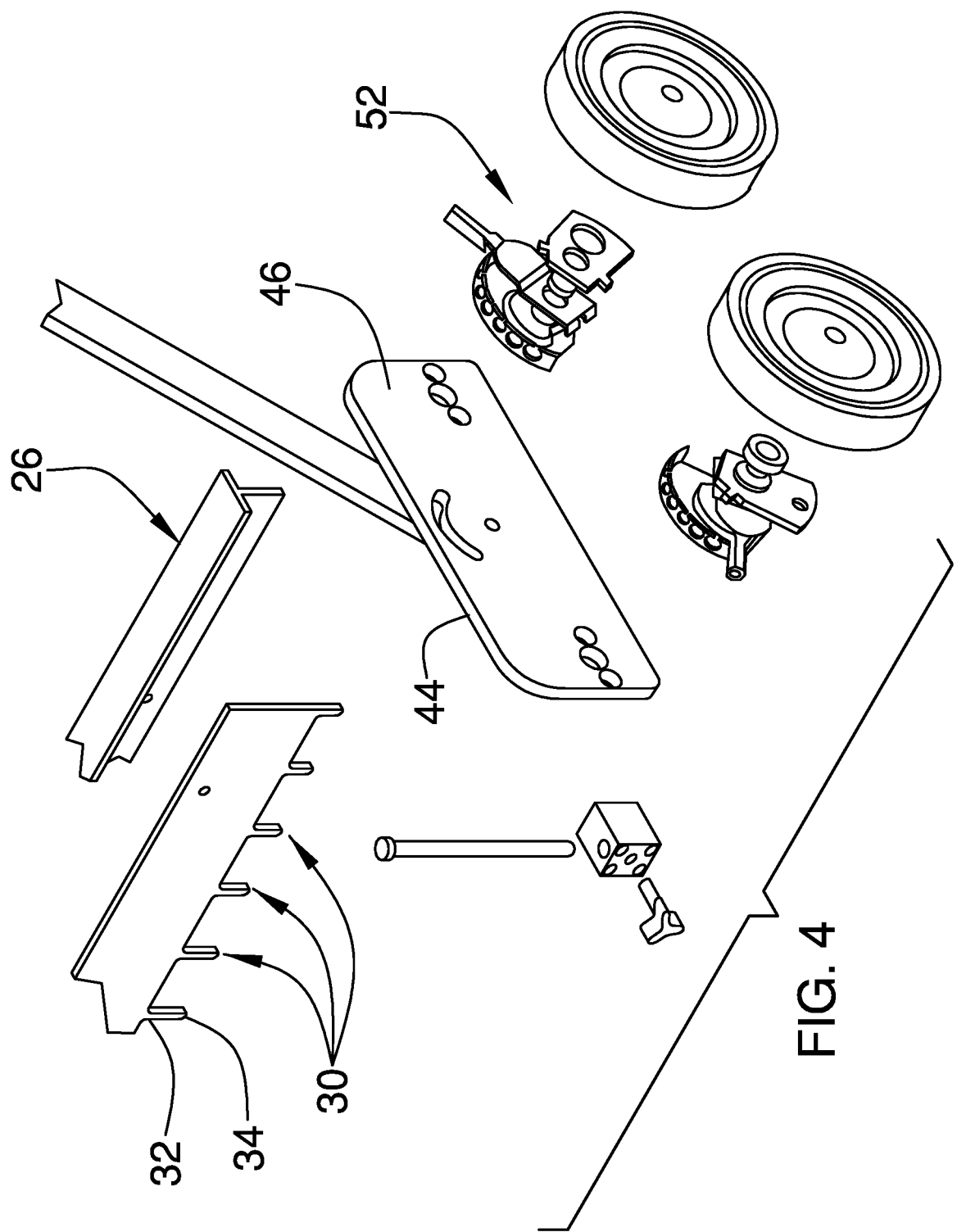
FIG. 4 is an isometric exploded view of an embodiment of the disclosure.
Figure 5:
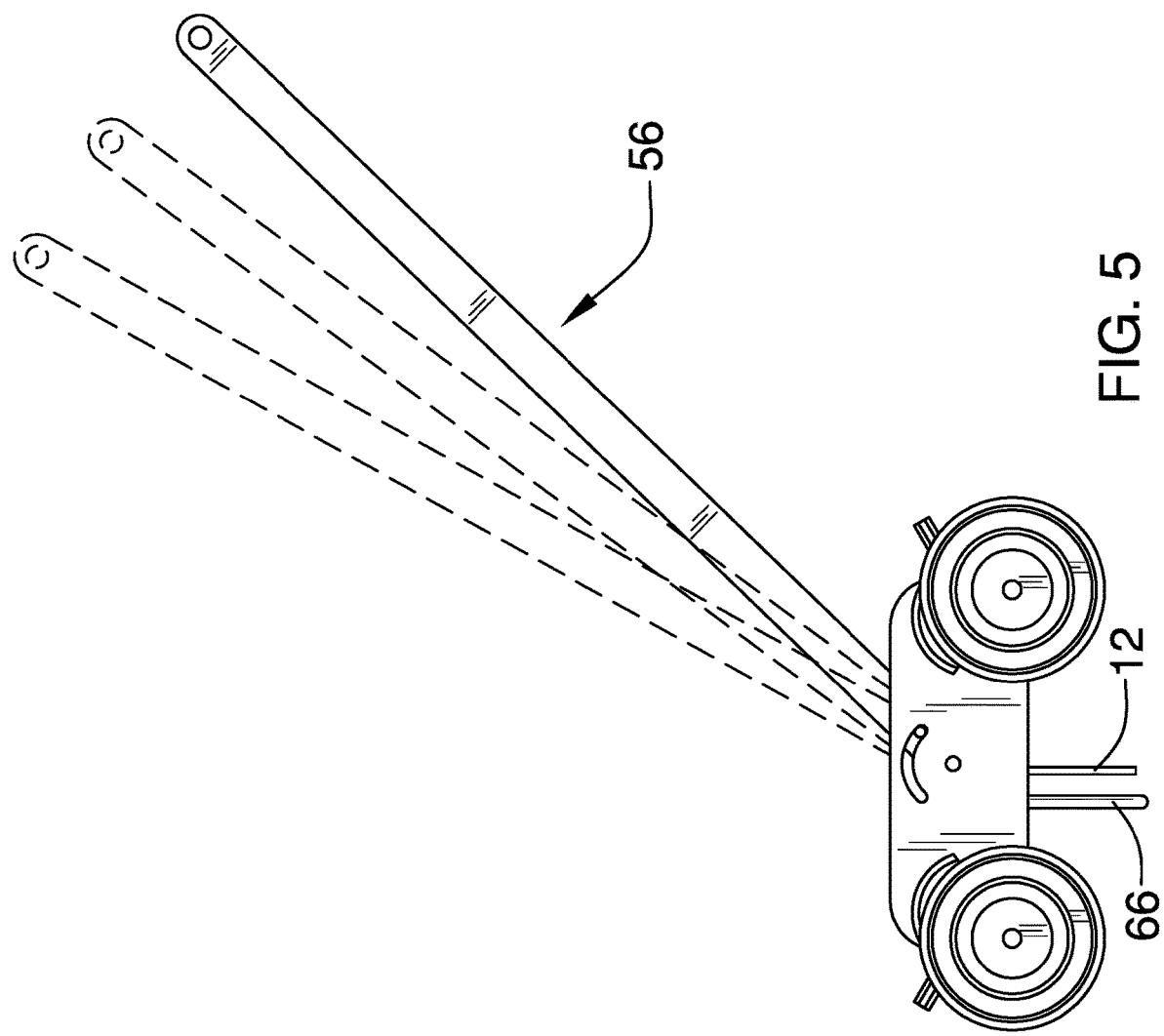
FIG. 5 is a side view of an embodiment of the disclosure.
Figure 6:
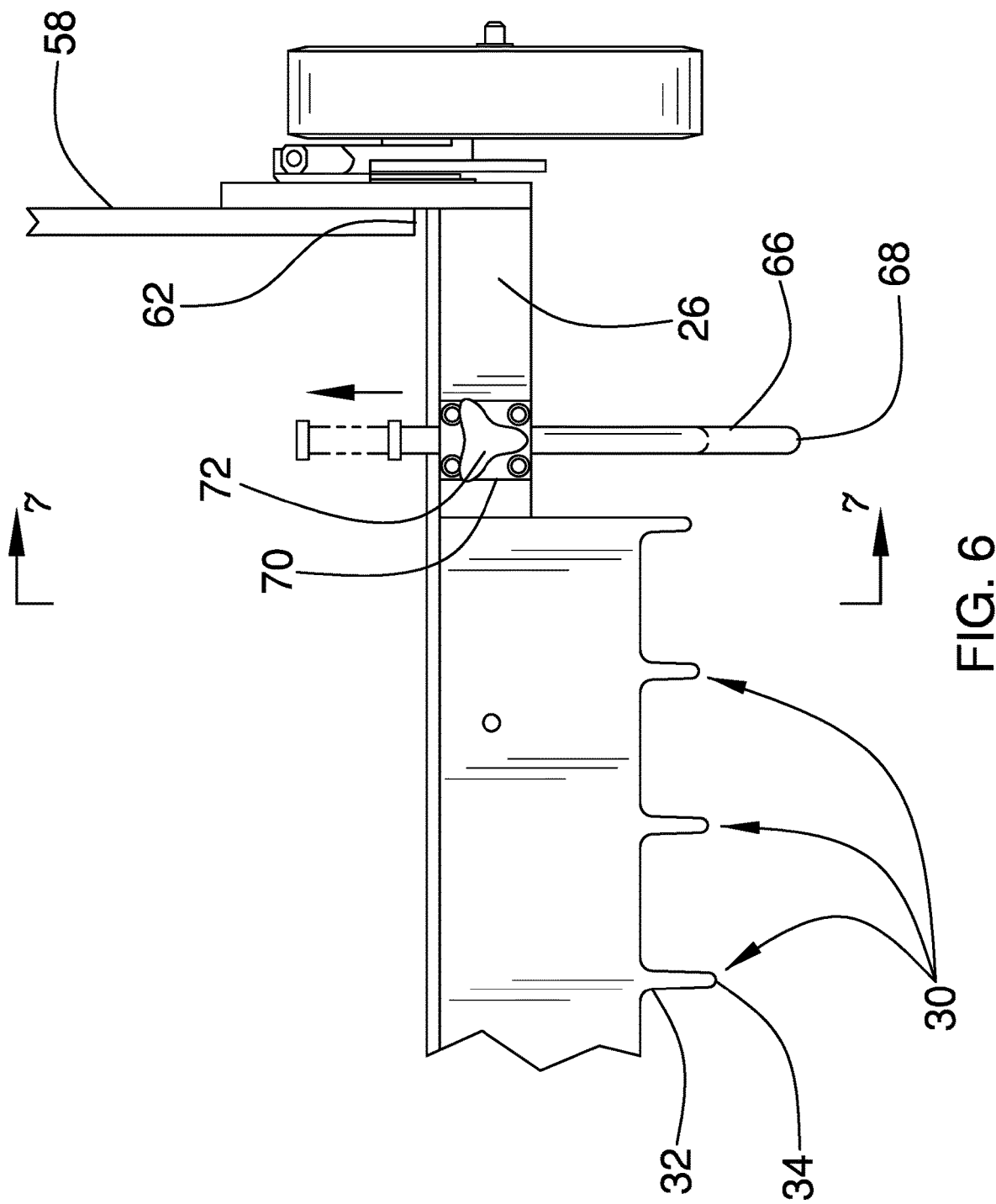
FIG. 6 is a front broken view of an embodiment of the disclosure.
Figure 7:
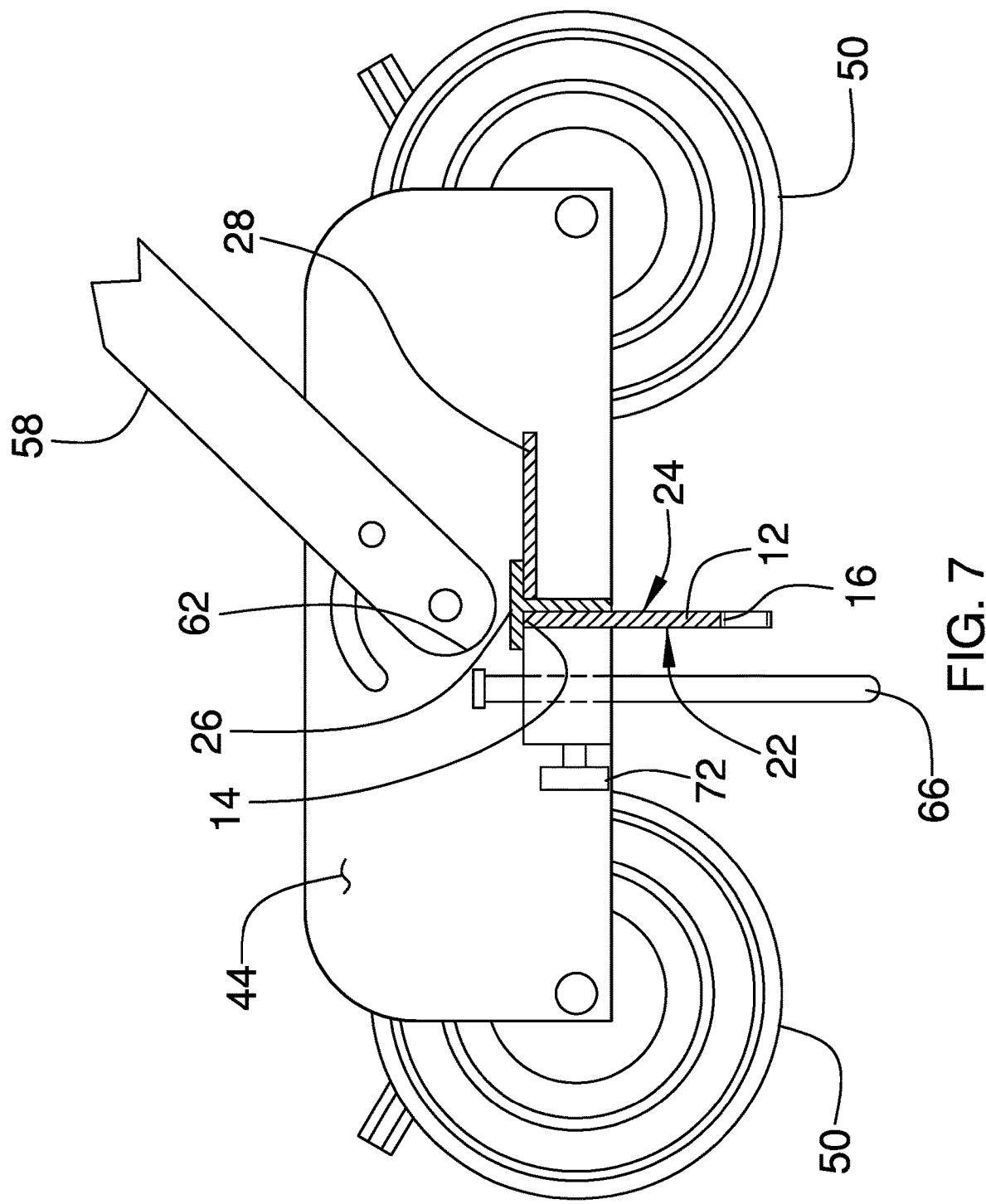
FIG. 7 is a cross-sectional view of an embodiment of the disclosure taken along line 7-7 of FIG. 6.

A first pair of wheels 48 is rotatably coupled to the exterior surface 46 of one of the end panels 40 and a second pair of wheels 50 is rotatably coupled to the exterior surface 46 of another one of the end panels 42. Each wheel of the first 48 and second 50 pair of wheels has an axis of rotation orientated parallel to the longitudinal axis of the plate 12 extending through the first 18 and second 20 lateral edges. The wheels of the first 48 and second 50 pair of wheels all extend below a bottom edge of the end panels 40, 42 such that the end panels 40, 42 and plate 12 are supported by wheels above a ground surface. As can be seen in FIG. 3, the tines extend downwardly farther than the wheels of the first 48 and second 50 pair of wheels. Each of the first 48 and second 50 pairs of wheels may be height adjustable relative to the end panels 40, 42. While any type of height adjustment assembly 52 may be utilized, those, such as shown in FIG. 2 and conventional to lawnmower wheels, may be utilized.

A first handle 54 is pivotally coupled to one of the end panels 40 and a second handle 56 is pivotally coupled to another one of the end panels 42. Each of the first 54 and second 56 handles includes a riser 58 and a grip 60. Each riser 58 is elongated, has a length between 3.0 feet and 5.0 feet, and has a lower end 62 pivotally coupled to an associated one of the end panels 40, 42. The risers 58 each have a longitudinal axis that is orientated perpendicular to the longitudinal axis of the plate 12. Each grip 60 is attached to an associated riser 58 and is positioned distal to a corresponding lower end 62 thereof. The grip 60 of the first handle 54 and the grip 60 of the second handle 58 extend in opposite directions with respect to each other. The risers 58 are pivotal in a vertical plane that is orientated perpendicular to longitudinal axis of the plate 12. This pivoting, along with the positioning of the grips 60, allows the user to retain downward pressure on the assembly 10 as it travels over sand 80 in a long jump pit 82 to prevent the assembly 10 from lifting upwardly when encountering mounds of sand and ensuring an even and level sand surface.

A first guide pin 64 is attached to the plate 12, or to the T-brace 26, adjacent to the interior surface 44 of one of the end panels 40 and a second guide pin 66 is attached to the plate 12, or to the T-brace 26, adjacent to the interior surface 44 of another of the end panels 42. Each of the first 64 and second 66 guide pins extends downwardly below a lowest point of the first 48 and second 50 pair of wheels and will typically extend downwardly farther away from the plate 12 than the bottom ends of the tines 30. The first 64 and second 66 guide pins each have free end 68 directed downwardly and each has an adjustable depth relative to the plate 12. The guide pins 64, 66 are positioned adjacent to outer walls of the long jump pit 82 to prevent the assembly 10 easily veering into the long jump pit 82. The first 64 and second 66 guide pins have adjustable height to account for different depths of sand and will typically extend into the sand at least 1.0 inches. More specifically, mounts 70 are attached to the plate 12 and the first 64 and second 66 guide pins each extend through one of the mounts 70. The mounts 70 each include a set screw 72 that may be utilized to releasably secure the first 66 and second 68 pins at a selected place in an associated one of the mounts 70.

Figure 8:
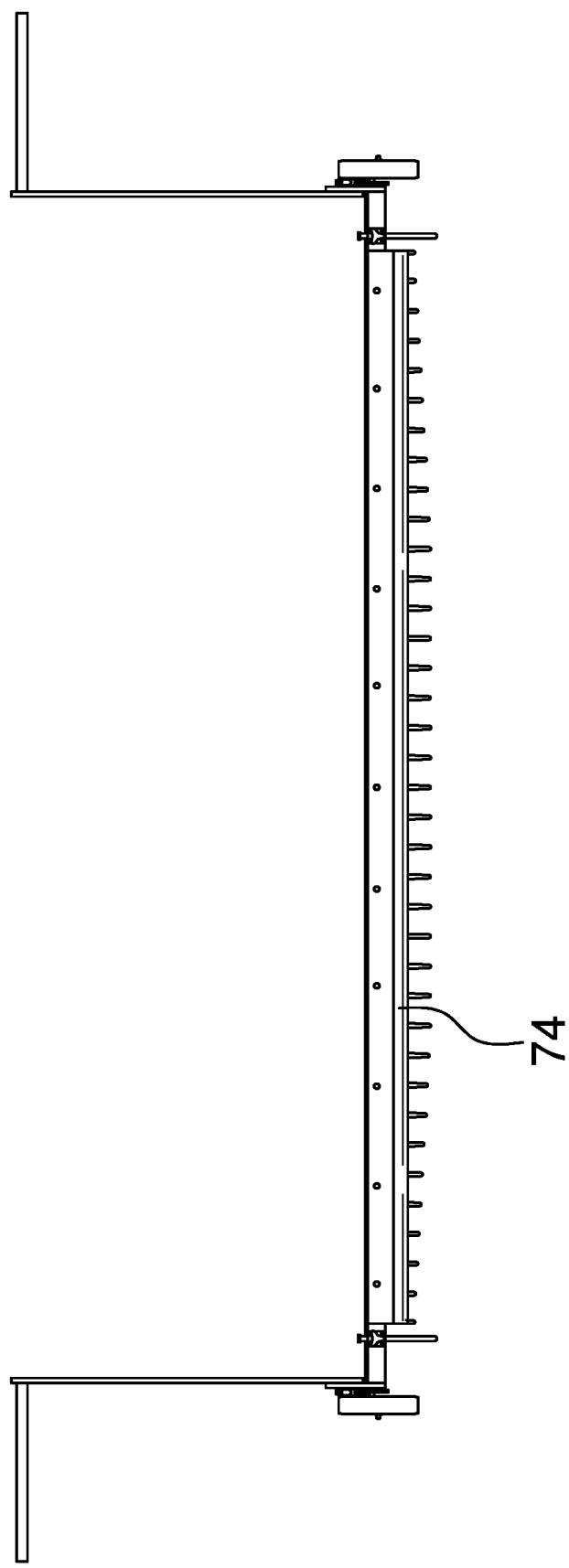
FIG. 8 is a rear view of an embodiment of the disclosure showing a grooming element.
Figure 9:
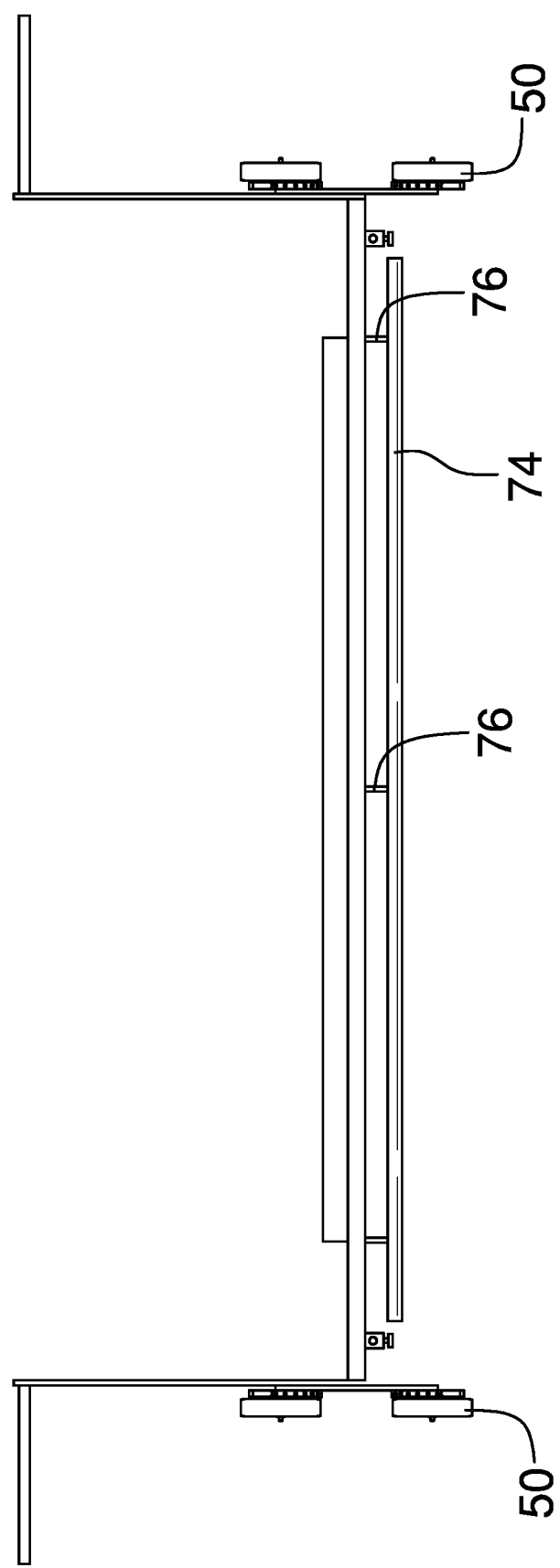
FIG. 9 is a top view of FIG. 8 of an embodiment of the disclosure.
Figure 10:
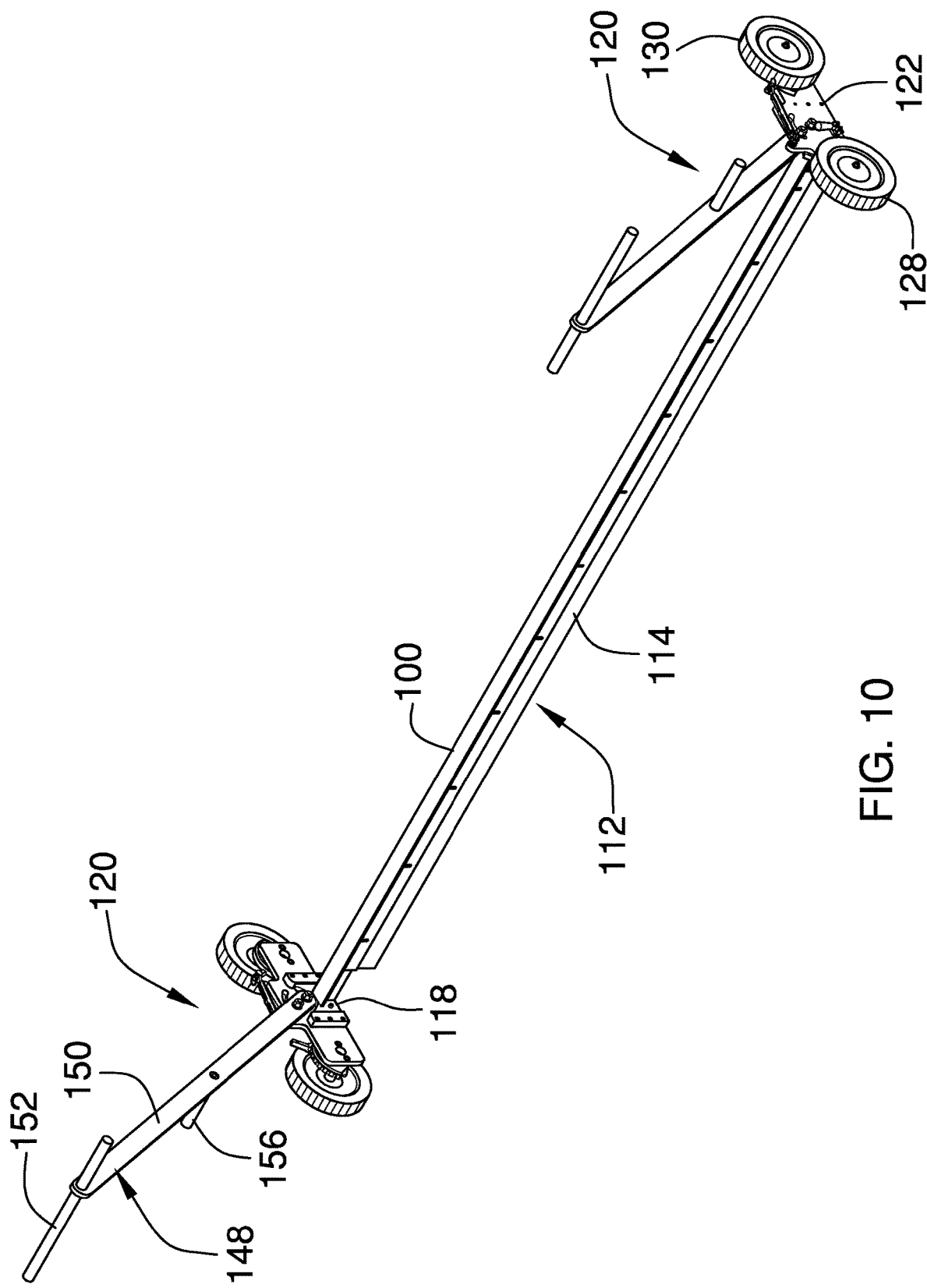
FIG. 10 is a rear isometric view of a jumping pit raking assembly according to an embodiment of the disclosure.
Figure 11:
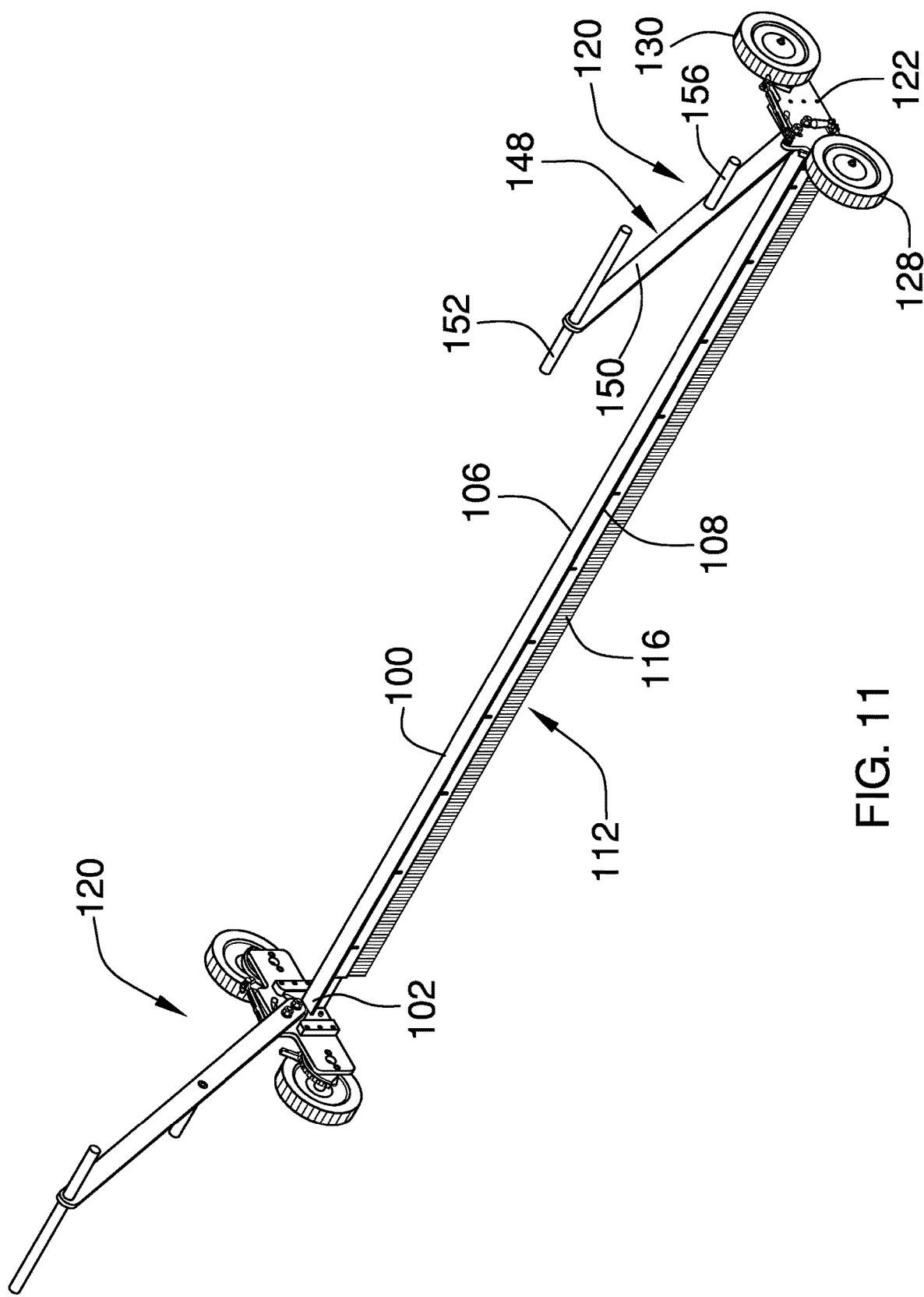
FIG. 11 is a rear isometric view of an embodiment of the disclosure.
Figure 12:
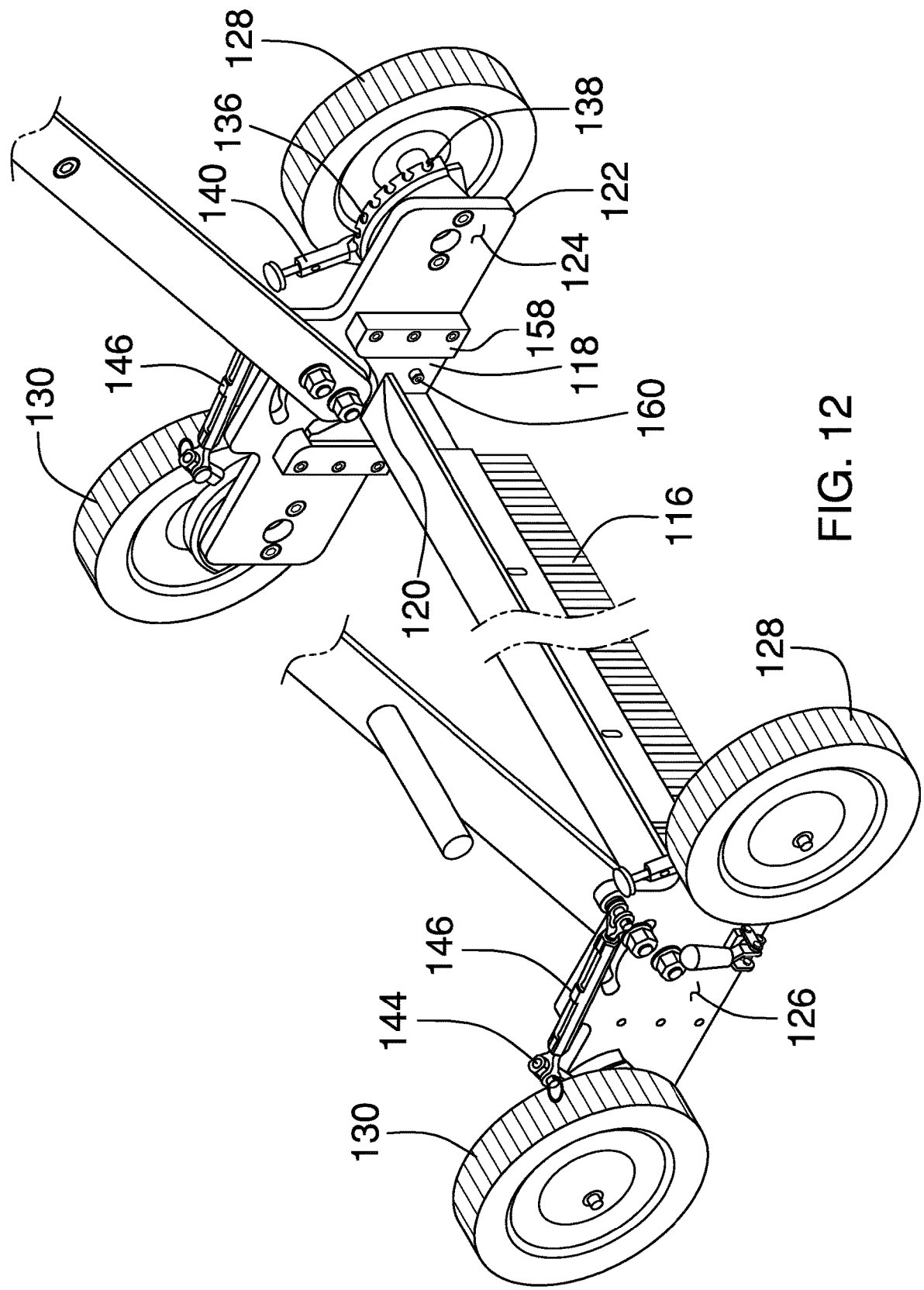
FIG. 12 is a rear broken isometric view of an embodiment of the disclosure.
Figure 13:
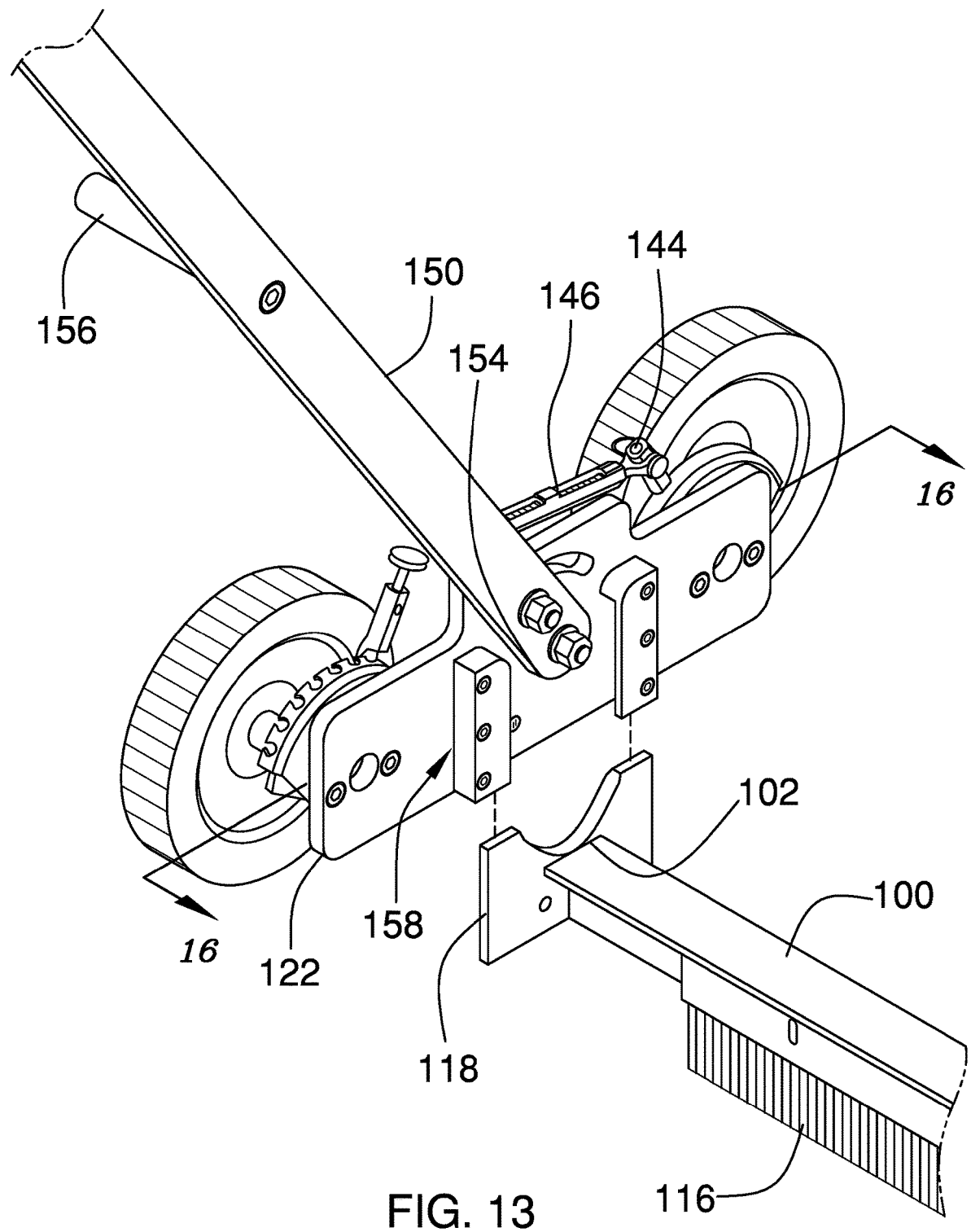
FIG. 13 is a rear exploded isometric view of an embodiment of the disclosure.
Figure 14:
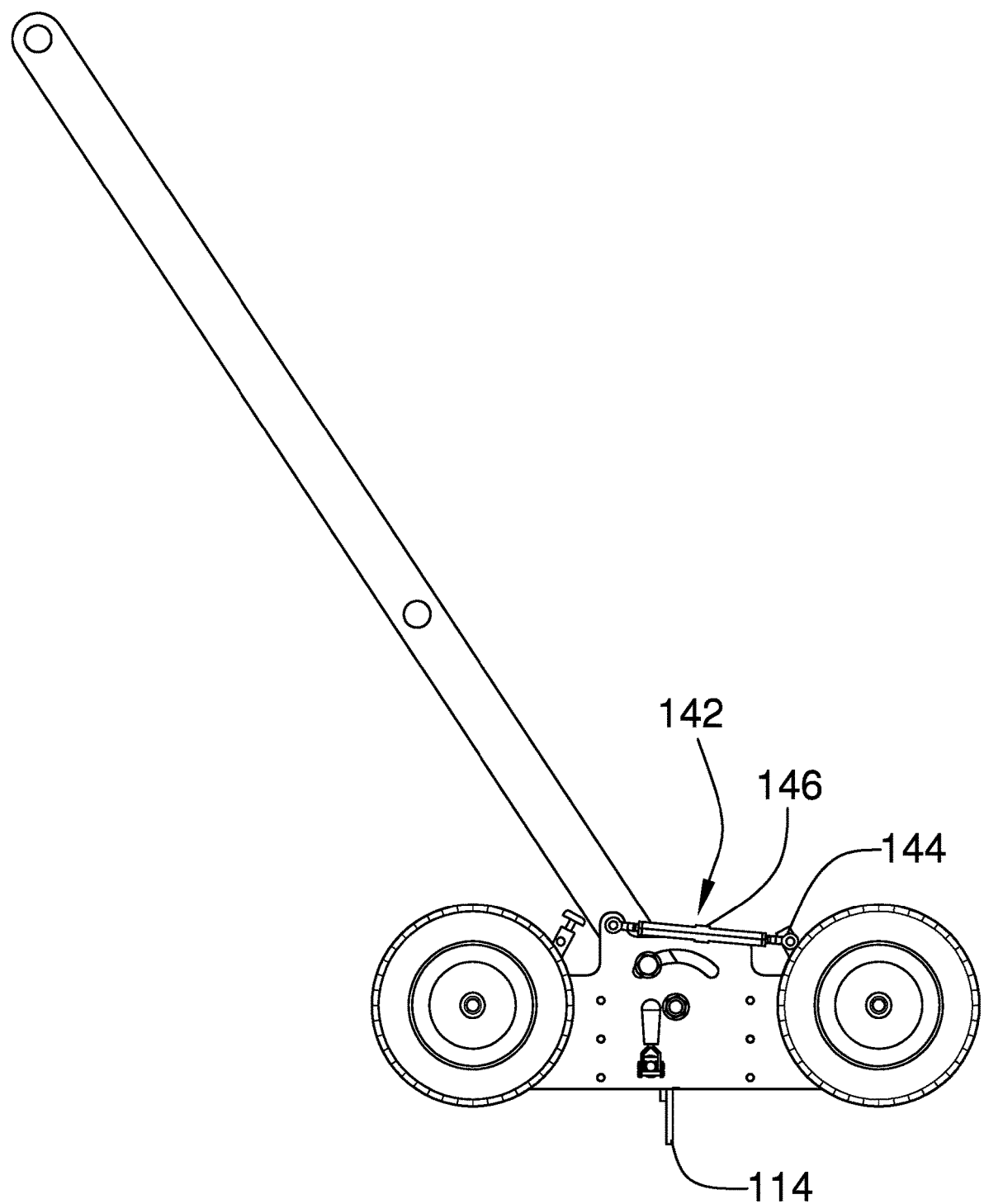
FIG. 14 is a side view of an embodiment of the disclosure.
Figure 15:
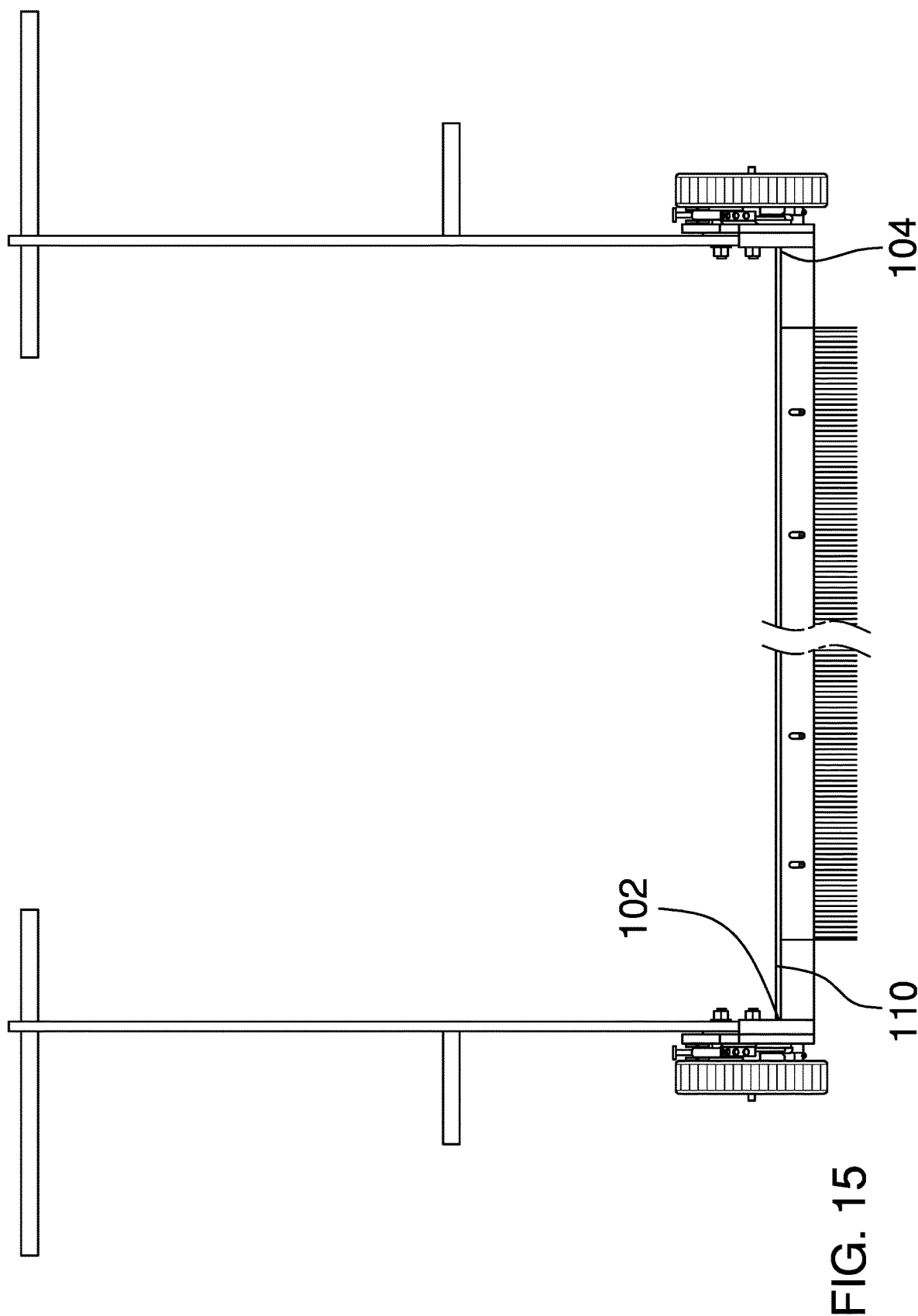
FIG. 15 is a rear view of an embodiment of the disclosure.
Figure 16:
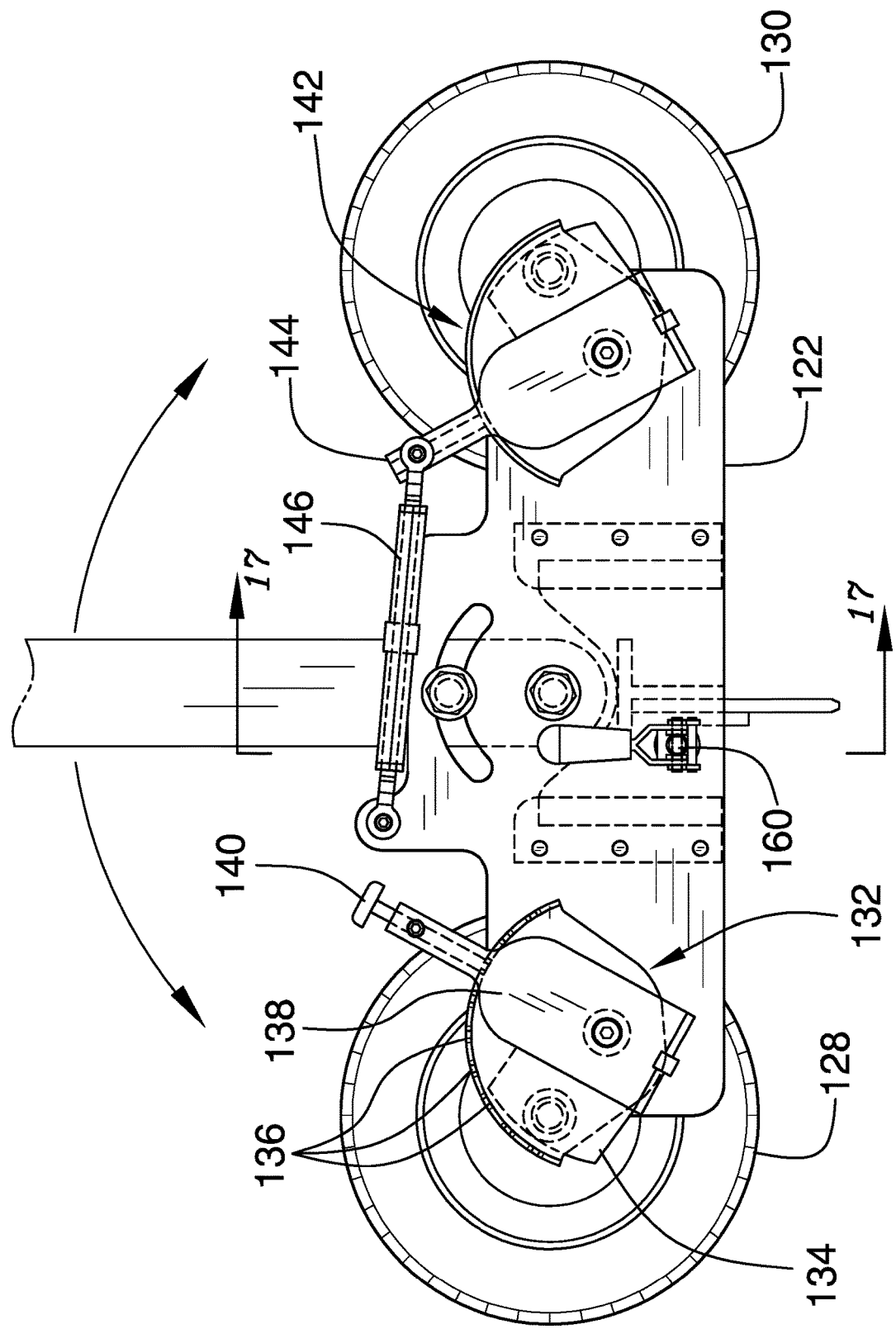
FIG. 16 is a cross-sectional view of an embodiment of the disclosure taken along line 16-16 of FIG. 13.
Figure 17:
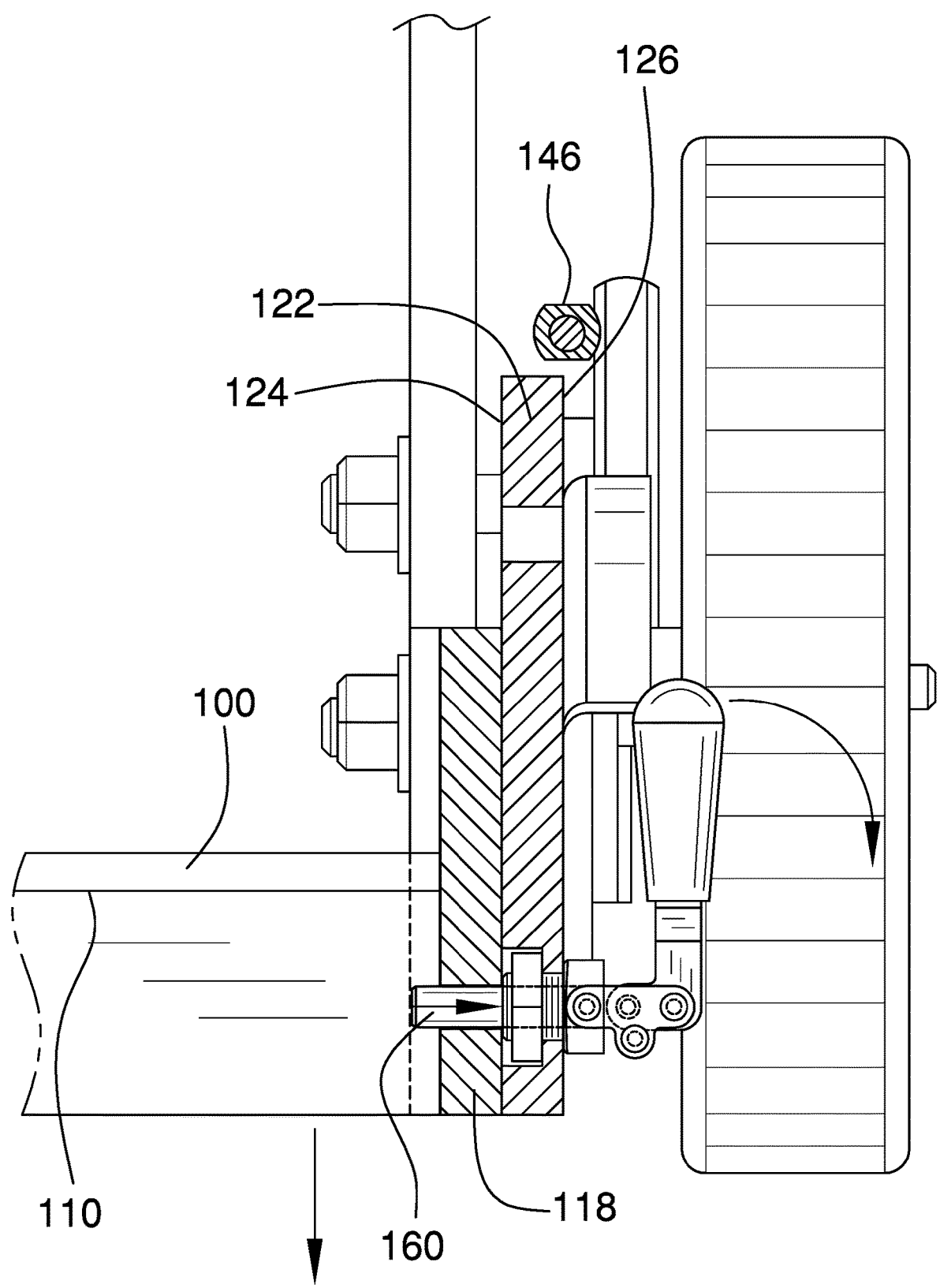
FIG. 17 is a cross-sectional view of an embodiment of the disclosure taken along line 17-17 of FIG. 16.

As shown in FIGS. 8 and 9, a grooming element may be coupled to the plate 12 or the top wall 28 of the T-brace 26. The grooming element would be approximately 8.5 feet to 9.5 feet. The grooming element may include a broom or an elongated cylinder 74, such as a PVC pipe. If an elongated cylinder 74 is used, it may be fixedly or removably coupled to the plate 12 or T-brace 26 by a series of rods 76 extending between the elongated cylinder 74 and the plate 12 or T-brace 26. When it is moved across the sand, the elongated cylinder 74 smoothes the surface of the sand 80 further such that the sand 80 is level and planar. The elongated cylinder further acts as a depth gauge to control the depth of the tines 30 in the sand. Generally, the cylinder 74 has a lowest surface which is positioned between 0.25 inches and 0.50 inches below the attached ends 32 of the tines 30.

In using the first embodiment, the assembly 10 is placed in a long jump sand pit 82 configured to receive athletes competing in events such as the long jump and the triple jump. The assembly 10 moved along the sand 80 to move displaced sand 80 back to a smooth condition to ensure that each athlete is provided with a fair chance with respect to each other as their jumps are measured to the first point of contact with the sand 80 and uneven sand 80 could provide some athletes advantages over others. The tines 30 have a generally similar length but shorten toward the outer portions of the plate 12 to account for sand typically is less disturbed along the lateral edges of the long jump sand pit 82.

In a second embodiment of the assembly 10, shown in FIGS. 10-17, the plate 12 may be considered an elongated member 100 having a first lateral edge 102, a second lateral edge 104, a front side 106, a rear side 108 and a bottom edge 110. The elongated member 102 has a length from the first lateral edge 102 to the second lateral edge 104 that is between 8.5 feet and 9.5 feet. The elongated member 100 may have T-shaped cross-section for strength purposes and is comprised of a rigid material.

A sand engaging member 112 is attached to the elongated member and extends downwardly from the bottom edge 110. The sand engaging member 112 is configured to engage sand 80 such that the sand 80 is smoothed as the sand engaging member 112 is moved across the sand 80. As stated above, the sand engaging member 112 may comprise a rigid member with tines 30, or other grooming element, however, in the second embodiment the sand engaging member 112 is resiliently flexible. The resiliently flexible sand engaging member 112 may comprise a blade 114 comprised of an elastomeric material or silicon material, for example. The blade 114 may be a solid blade or may be broken into strips. Alternatively, the sand engaging member 112 may comprise a plurality of bristles, comprised of elastomeric, natural or synthetic cloth filaments and define a brush 116. In yet another embodiment, the sand engagement member 112 may include a brush 116 and a blade 114 used together with one in front of the other. The sand engaging member 112 extends along a portion of a length of the elongated member 100 and is spaced from the first 102 and second 104 lateral edges. The sand engaging member 112 extends less than 3.5 inches downwardly a bottommost edge of the elongated member 100.

A pair of first mating members 118 is provided. Each of the first 102 and second 104 lateral edges has one of the first mating members 118 attached thereto. In one embodiment, the first mating members 118 comprise a male panel being substantially planar and lying in an plane orientated perpendicular to a longitudinal axis of the elongated member 100.

A pair of carriages 120 is provided and each of the carriages 120 comprises an end panel 122 having an interior side 124 and an exterior side 126 positioned opposite of each other. A first wheel 128 and a second wheel 130 are each rotatably coupled to the end panel 122 and extend downwardly from the end panel 122. The first 128 and second 130 wheels have axes of rotation that are orientated parallel to each other and which extend through a plane of the end panel 122. One of the first 128 or second 130 wheels is positioned rearward on the end panel 122 and one of the first 128 or second 130 wheels is positioned forward on the end panel 122. The first 128 and second 130 wheels may be positioned in a same plane as each other wherein the plane of the first 128 and second 130 wheels is orientated perpendicular to the axes of rotation. The first 128 and second 130 wheels are attached to the exterior side 126.

Each of the carriages 120 further includes a primary height adjuster 132 mechanically coupling the first wheel 128 to the end panel 122. The primary height adjuster 132 is configured to adjust a distance the first wheel 128 extends downwardly from the end panel 122. The primary height adjuster 132 is a macro adjuster having fixed incremental adjustments facilitating macro height movements and may be similar to lawnmower wheel lifting/lowering assemblies as described above with respect to the first embodiment. In an example of such an assembly, the first wheel 128 is rotatably mounted to a first plate 134 that is in turn mounted to a second plate 138 which is rotatably attached to the end panel 122. An arm 140 is secured to the second plate 138 and is movably inserted into one of a series of notches 136. The notch 136 in which the arm 140 is positioned determines how low or high the first wheel 128 will be positioned relative to the end panel 122. A secondary height adjuster 142 mechanically couples the second wheel 130 to the end panel 122 and is configured to adjust a distance the second wheel 130 extends downwardly from the end panel 122. The secondary height adjuster 142 may also include a macro adjuster. However, the secondary height adjuster 142 may alternatively not utilize the notches 136, or use the notches 136 first for macro adjustments, and instead include an arm 144 secured to the end panel 122 by a micro adjuster having variable incremental adjustments facilitating micro height adjustments. As can be seen in the Figures, one example of a micro adjuster may include a turnbuckle 146 allowing the user to move the arm 144 of the secondary height adjuster 142 by rotation of the turnbuckle 146. Using the macro adjuster of the primary height adjuster 132 and the micro adjuster of the secondary height adjuster 142 will allow for very accurate height changes between the sand 80 and the sand engaging member 112.

The carriages 120 each further include a handle 148 that is pivotally coupled to the end panel 122. The handle 120 includes a riser 150 and a grip 152. Each riser 150 is elongated and has a lower end 154 pivotally coupled the end panel 122. The riser 150 has a longitudinal axis orientated perpendicular to a longitudinal axis of the elongated member 100. The grip 152 is attached to the riser 150 and is positioned distal to the lower end 154. The grip 152 may extend laterally to the left and right of the riser 150. A hold 156 is attached to the handle 148 and is spaced from and between the grip 152 and the lower end 154. The hold 156 extends laterally outward from the handle 148 and is used to facilitate lifting and orientating the assembly 10 as needed.

A pair of second mating members 158 is provided. Each of the carriages 120 has one of the second mating members 158 attached thereto. The first mating members 118 are removably coupled to one of the second mating members 158 such that the elongated member 100 is extended between and supported by the carriages 120 as the carriages 120 are moved across a ground surface. The removability of the carriages 120 from the elongated member 100 facilitates transportation of the assembly 10 between locations or allows a long jump sand pit 82 owner to purchase only a portion of the assembly 10 as the remaining portions are transported from sand pit 82 to sand pit 82. Alternatively, an owner of multiple long jump sand pits 82 could purchase an elongated member 100 for each long jump sand pit 82 and only a single pair of carriages 120 to reduce costs. The second mating members 158 comprise receivers for slidably receiving an associated one of the first mating members 118.

A locking rod 160 extends through the end panel 122 and into the first mating member to releasably lock the first mating member relative to the second mating member.

As with the first embodiment, the second embodiment of the assembly 10 is placed in a long jump sand pit 82 and the sand engagement member moved along the sand 80 to move displaced sand 80 back to a smooth condition.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rake assembly configured for raking sand located in a jump pit, the rake assembly comprising:
    an elongated member having a first lateral edge, a second lateral edge, a front side, a rear side and a bottom edge;
    a sand engaging member being attached to said elongated member and extending downwardly from said bottom edge, said sand engaging member being configured to engage sand such that the sand is smoothed as said sand engaging member being moved across the sand; and
    a pair of carriages, each of said carriages comprising:
        an end panel having an interior side and an exterior side positioned opposite of each other;
        a first wheel and a second wheel each being rotatably coupled to said end panel and extending downwardly from said end panel, said first and second wheels each having an adjustable height;
        a handle coupled to said end panel;
        a primary height adjuster mechanically coupling said first wheel to said end panel, said primary height adjuster being configured to adjust a distance said first wheel extends downwardly from said end panel, said primary height adjuster being a macro adjuster having fixed incremental adjustments facilitating macro height movements; and
        a secondary height adjuster mechanically coupling said second wheel to said end panel, said secondary height adjuster being configured to adjust a distance said second wheel extends downwardly from said end panel, said secondary height adjuster being a micro adjuster having variable incremental adjustments facilitating micro height adjustments.

2. The rake assembly according to claim 1, wherein said elongated member has a length from said first lateral edge to said second lateral edge that being between 8.5 feet and 9.5 feet.

3. The rake assembly according to claim 1, wherein said sand engaging member is resiliently flexible.

4. The rake assembly according to claim 3, wherein said sand engaging member comprises a plurality of bristles to define a brush.

5. The rake assembly according to claim 3, wherein said sand engaging member comprises a plurality an elastomeric blade.

6. The rake assembly according to claim 3, wherein said sand engaging member extends along a portion of a length of said elongated member and is spaced from said first and second lateral edges.

7. The rake assembly according to claim 3, wherein said sand engaging member extends less than 3.5 inches downwardly from said elongated member.

8. The rake assembly according to claim 3, further including:
    a pair of first mating members, each of said first and second lateral edges having one of said first mating members attached thereto; and
    a pair of second mating members, each of said carriages having one of said second mating members attached thereto, each of said first mating members being removably coupled to one of said second mating members such that said elongated members is extended between and supported by said carriages as said carriages are moved across a ground surface.

9. The rake assembly according to claim 1, further including:
    a pair of first mating members, each of said first and second lateral edges having one of said first mating members attached thereto; and
    a pair of second mating members, each of said carriages having one of said second mating members attached thereto, each of said first mating members being removably coupled to one of said second mating members such that said elongated members is extended between and supported by said carriages as said carriages are moved across a ground surface.

10. The rake assembly according to claim 1, wherein each of said carriages further comprises said first and second wheels having axes of rotation being orientated parallel to each other, one of said first or second wheels being positioned rearward on said end panel and one of said first or second wheels being positioned forward on said end panel.

11. The rake assembly according to claim 10, wherein each of said carriages further comprises said first and second wheels lying in a same plane orientated perpendicular to said axes of rotation, said first and second wheels being attached to said exterior side.

12. The rake assembly according to claim 1, wherein each of said carriages further comprises said handle being pivotally coupled to said end panel.

13. The rake assembly according to claim 12, wherein each of said carriages further comprises said handle including a riser and a grip, each riser being elongated and having a lower end pivotally coupled said end panel, said riser having a longitudinal axis orientated perpendicular to a longitudinal axis of the elongated member, said grip being attached to said riser and being positioned distal to said lower end.

14. The rake assembly according to claim 13, wherein each of said carriages further comprises a hold being attached to said handle and being spaced from said grip and said lower end, said hold extending laterally outward from said handle.

15. The rake assembly according to claim 1, wherein each of said carriages further comprises said handle being pivotally coupled to said end panel, said handle including a riser and a grip, each riser being elongated and having a lower end pivotally coupled said end panel, said riser having a longitudinal axis orientated perpendicular to a longitudinal axis of the elongated member, said grip being attached to said riser and being positioned distal to said lower end, a hold being attached to said handle and being spaced from said grip and said lower end, said hold extending laterally outward from said handle.

16. A rake assembly configured for raking sand located in a jump pit, the rake assembly comprising:
- an elongated member having a first lateral edge, a second lateral edge, a front side, a rear side, and a bottom edge, said elongated member having a length from said first lateral edge to said second lateral edge that being between 8.5 feet and 9.5 feet;
- a sand engaging member being attached to said elongated member and extending downwardly from said bottom edge, said sand engaging member being configured to engage sand such that the sand is smoothed as said sand engaging member being moved across the sand, said sand engaging member being resiliently flexible, said sand engaging member comprising an elastomeric blade, said sand engaging member extending along a portion of a length of said elongated member and being spaced from said first and second lateral edges, said sand engaging member extending less than 3.5 inches downwardly from said elongated member;
- a pair of first mating members, each of said first and second lateral edges having one of said first mating members attached thereto;
- a pair of carriages, each of said carriages comprising:
  - an end panel having an interior side and an exterior side positioned opposite of each other;
  - a first wheel and a second wheel each being rotatably coupled to said end panel and extending downwardly from said end panel, said first and second wheels having axes of rotation being orientated parallel to each other, one of said first or second wheels being positioned rearward on said end panel and one of said first or second wheels being positioned forward on said end panel, said first and second wheels lying in a same plane orientated perpendicular to said axes of rotation, said first and second wheels being attached to said exterior side;
  - a primary height adjuster mechanically coupling said first wheel to said end panel, said primary height adjuster being configured to adjust a distance said first wheel extends downwardly from said end panel, said primary height adjuster being a macro adjuster having fixed incremental adjustments facilitating macro height movements;
  - a secondary height adjuster mechanically coupling said second wheel to said end panel, said secondary height adjuster being configured to adjust a distance said second wheel extends downwardly from said end panel, said secondary height adjuster being a micro adjuster having variable incremental adjustments facilitating micro height adjustments;
  - a handle being pivotally coupled to said end panel, said handle including a riser and a grip, each riser being elongated and having a lower end pivotally coupled said end panel, said riser having a longitudinal axis orientated perpendicular to a longitudinal axis of the elongated member, said grip being attached to said riser and being positioned distal to said lower end;
  - a hold being attached to said handle and being spaced from said grip and said lower end, said hold extending laterally outward from said handle;
- a pair of second mating members, each of said carriages having one of said second mating members attached thereto, each of said first mating members being removably coupled to one of said second mating members such that said elongated members is extended between and supported by said carriages as said carriages are moved across a ground surface.

* * * * *